Dec. 29, 1964
M. BODIAN
3,163,367
LIGHT DIFFUSER
Filed Aug. 10, 1959
4 Sheets-Sheet 1
FIG. 1.
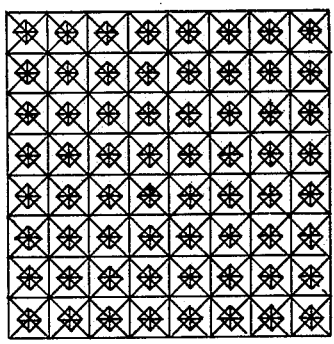
FIG. 2.
FIG. 3.
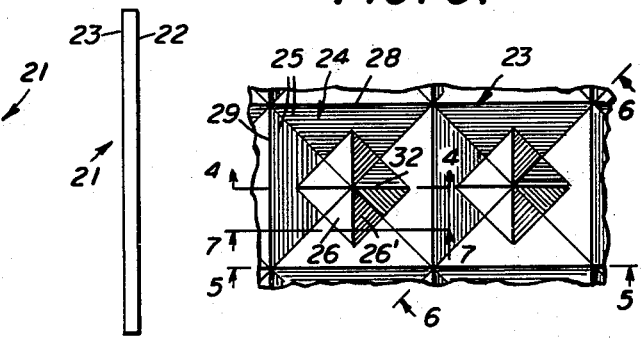
FIG. 5.
FIG. 6.
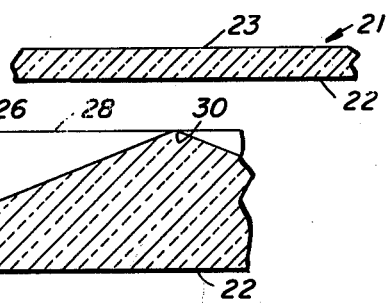
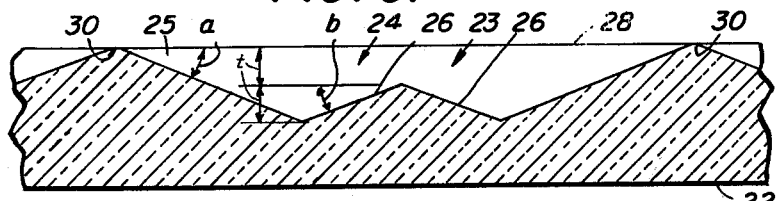
FIG. 4.
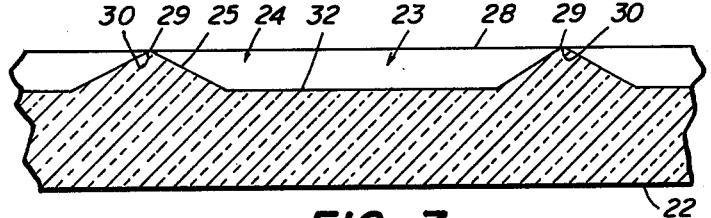
FIG. 7.
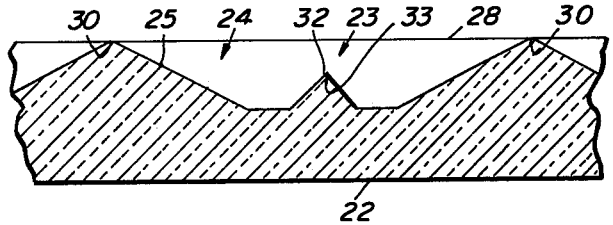
INVENTOR
MARCUS BODIAN
BY
ATTORNEY

INVENTOR
MARCUS BODIAN
BY
ATTORNEY

Dec. 29, 1964   M. BODIAN   3,163,367
LIGHT DIFFUSER

Filed Aug. 10, 1959   4 Sheets-Sheet 4

INVENTOR:
MARCUS BODIAN,
BY
ATTORNEY.

United States Patent Office 3,163,367
Patented Dec. 29, 1964

3,163,367
LIGHT DIFFUSER
Marcus Bodian, 2720 Monte Mar Terrace,
Los Angeles, Calif.
Filed Aug. 10, 1959, Ser. No. 832,828
21 Claims. (Cl. 240—106)

This invention relates to a light diffuser and in particular to one which will scatter direct light from an intense light source, such as for example, a fluorescent lamp.

One object of the invention is to provide a light diffuser which effectively and efficiently scatters and distributes diffused light when interposed between a bright light source and an observer.

Another object is to provide a light diffuser which to an observer viewing it from a distance, such as the distance of an observer on the floor from a ceiling light source, presents no large areas of directly transmitted light from an intense light source, such as for example, the sun, or a fluorescent lamp, or an incandescent filament lamp.

Another object is to provide a relatively thin, lightweight light diffuser having one plane face and an opposite face provided in the preferred form of my invention with crossed transverse and longitudinal reinforcing ridges.

A still further object is to provide a patterned plate of transparent material which when interposed between a bright light source and an observer presents from any particular angle of observation only relatively small areas of bright light interspersed with similar small areas which transmit light of low intensity or transmit only a small fraction of the light striking the corresponding plane surface areas, thereby giving an overall diffused effect when viewed from any usual angle of observation.

These and other objects are attained by my invention which will be understood from the following description, reference being made to the accompanying drawings in which:

FIG. 1 is a plan view of a portion of a diffuser plate in accordance with my invention;

FIG. 2 is an edge view of the diffuser plate shown in FIG. 1;

FIG. 3 is an enlarged fragmentary plan view showing two adjacent unit areas of a preferred form of the patterned diffuser plate of FIG. 1, wherein the pyramids are intaglio with respect to the patterned face of the plate;

FIG. 4 is a cros-sectional view taken on the line 4—4 of FIG. 3;

FIG. 5 is a cross-sectional view taken on the line 5—5 of FIG. 3;

FIG. 6 is a cross-sectional view taken on the line 6—6 of FIG. 3;

FIG. 7 is a cross-sectional view taken on the line 7—7 of FIG. 3;

Figure 8:
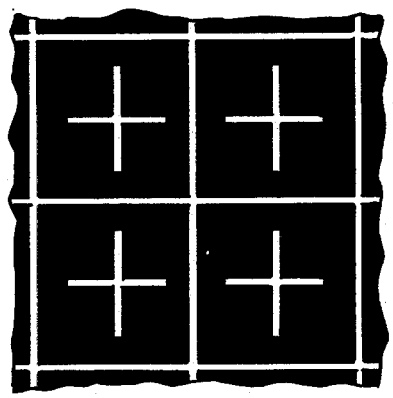
FIG. 8 is a diagrammatic view showing the pattern of direct light transmission of the diffuser plate from the rounded ridges of FIG. 3 when viewed by an observer below a room lighting source.

In the preferred form of my invention, shown particularly in FIGS. 3–7, a transparent plate 21 is provided with a first surface 22 which is substantially a plane, and with a second surface 23 which has an impressed light scattering but low light-absorption pattern consisting of adjoining small unit areas each consisting of a frusto-pyramidal cavity having contained therein a pair of crossed prisms disposed with their ridges directed toward the base of said pyramidal cavity, the prisms being arranged symmetrically at right angles, and within said cavity, and having their ridges 32 parallel to and below the plane of the base 28 of said frusto-pyramidal cavity. The four walls 25 of the pyramidal cavity 24 intersect the eight surfaces of the pair of crossed prisms 26 and 26' within the pyramidal cavity. The walls 25 of the pyramidal cavity each intersect a similar wall of the adjoining pyramidal cavity of the whole pattern, forming ridges 29 arranged in square patterns which define the outermost plane of the patterned side 23 of the plate, and constitute the base of the pyramidal cavity.

The pyramidal base ridges 29 are preferably slightly rounded as at 30 to a flat arc instead of being sharp, as shown particularly in FIGS. 4, 6 and 7, which structure provides narrow areas for direct light transmission from the first surface 22 so that in effect these ridges always appear bright when viewed by an observer.

The prism ridges 32 of the pair of crossed prisms 26 and 26' are also preferably slightly rounded to provide narrow flat arcuate areas of direct transmission of light from the first surface 22. These rounded prism edges 33, therefore, appear as bright areas to an observer. The rounded ridges 30 of the adjoining pyramidal bases and the rounded edges 33 of the crossed prisms 26 when viewed by an observer below the light source produces a narrow line bright light pattern as shown in the diagram FIG. 8, the width of the lines depending upon the angle of observation as well as upon the depth of the rounding.

Figure 9:
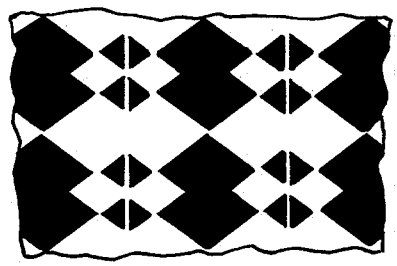
FIG. 9 is a diagrammatic representation of the alternate light and dark areas of the diffuser plate shown in FIG. 1, when viewed by an observer at an angle of less than about 30° from the vertical.
Figure 10:
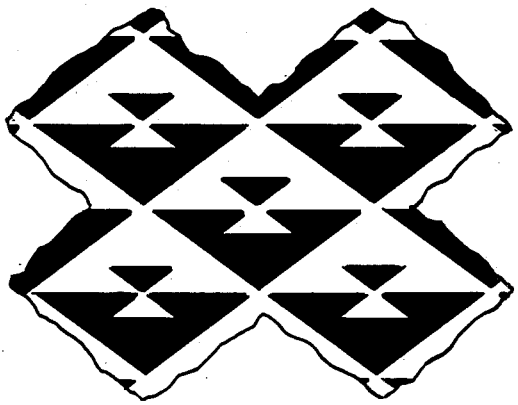
FIG. 10 is a diagrammatic view of another pattern of light and dark areas showing the diffuser plate of FIG. 1 as it appears from another angle of observation.
Figure 11:
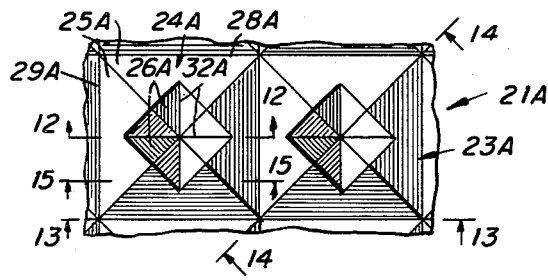
FIG. 11 is an enlarged fragmentary plan view showing two adjacent unit areas of an alternative form of the patterned diffuser plate of FIG. 1, wherein the pyramids are in relief with respect to the patterned face of the plate.
Figure 12:
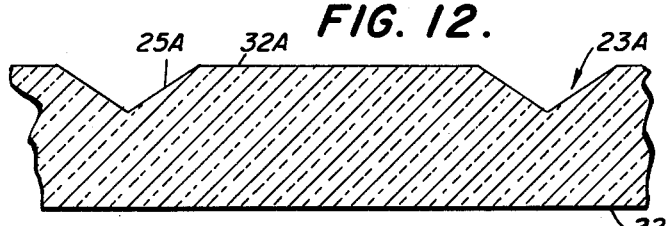
FIG. 12 is a cross-sectional view taken on the line 12—12 of FIG. 11.
Figure 13:
FIG. 13 is a cross-sectional view taken on the line 13—13 of FIG. 11, with background elevation shown for clarity.
Figure 14:
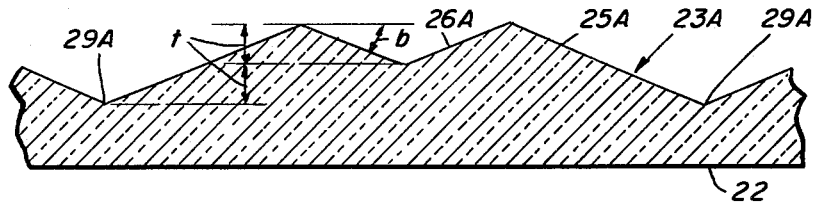
FIG. 14 is a cross-sectional view taken on the line 14—14 of FIG. 11.
Figure 15:
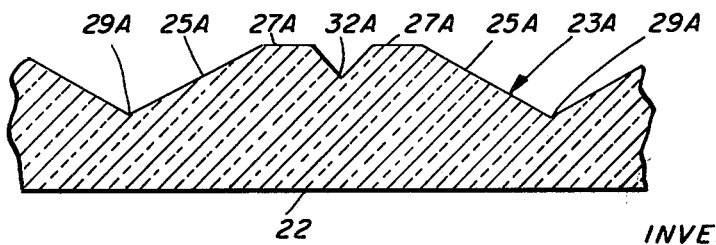
FIG. 15 is a cross-sectional view taken on the line 15—15 of FIG. 11.
Figure 16:
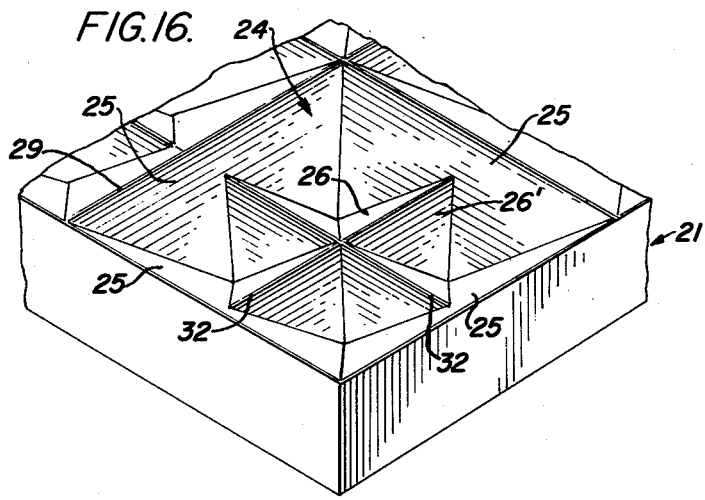
FIG. 16 is a perspective view of a fragment of the species shown in FIGS. 1 to 7.
Figure 17:
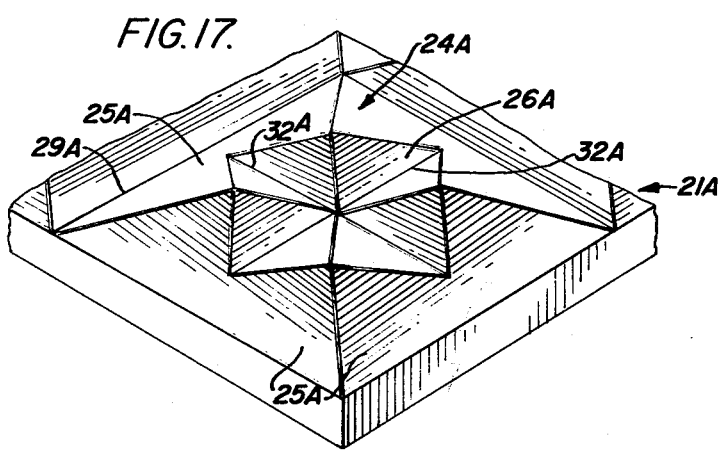
FIG. 17 is a perspective view of a fragment of the intaglio species shown in FIGS. 11 to 15.

When the diffuser plate is viewed from an angle not greater than about 30° from the vertical, various patterns of relatively light and relatively dark areas are presented to an observer, some representative patterns being shown in the diagrams of FIGS. 9 and 10, the brighter areas being shown all white, and the darker areas being shown all black, although it will be understood that the areas are not wholly light or wholly dark.

The observed pattern of relatively light and relatively dark areas varies not only as to the particular shaped areas which are light or dark but also as to the difference in intensity of the light in any particular area. The whole effect, however, because of the small size of the pattern areas relative to the entire area which is visible to the observer, presents no individual sources of light which are bright enough to be objectionable to a viewer because of the adjacent darker areas as viewed from any particular angle.

In the alternative form of my invention shown in FIGS. 11 to 15 inclusive, the patterned face of the diffuser plate is in relief, and is the obverse to the preferred form shown in FIGS. 3 to 7 inclusive, wherein the pattern is shown intaglio. The optical results are analogous. In FIGS. 11 to 15, the transparent plate 21A is provided with a first surface 22 which is substantially a plane, and with a second surface 23A which has an impressed light scattering but low light-absorption pattern consisting of adjoining small unit areas each consisting of a relief pyramid at the apex of which is a cavity consisting of a pair of crossed prisms disposed with their ridges directed toward the base of the pyramid 24A, said crossed prism cavity being arranged symmetrically, and at right angles, and having their intaglio ridges 32A parallel to and above the plane of the base 28A of said relief pyramid 24A. The four walls 25A of the pyramid 24A each intersect a similar wall of the adjoining pyramid of the whole pattern, forming grooves or intaglio ridges 29A arranged in square patterns. The walls 25A of the pyramid are intersected between the base and the apex by the surfaces 27A of the intaglio crossed prisms 26A forming 8 small triangular areas in each unit pattern, the planes of the areas being at low angles with the plane of the first surface 22 of the transparent plate.

The ridges as well as the V-grooves of the pattern of the alternative form may also be rounded off to short flat arcs to make the pattern less sharp, which has the result of allowing the direct transmission of some light at substantially undiminished intensity through these rounded edges. This rounding of the sharp ridges and valleys is also advantageous in the preparation and maintenance of the pattern-forming die, as well as preventing the nicking of too sharp ridges in the fabrication and maintenance of the light fixtures of which the diffusion plate of my invention is a part.

It is, of course, contemplated that either the first surface 22 or the second surface 23 or 23A may, in fact, receive incident light from the source, the effects observed by a viewer below the plate being the same as described above.

The material of which the diffuser plate may be composed may be of transparent glass or transparent synthetic plastic materials such as polystyrene, or polymethacrylate, or other rigid synthetic transparent material. Polystyrene is the preferred material because of its mechanical properties and because it does not become colored after long use.

The pattern of pyramidal cavities and intersecting crossed prisms as above described may be pressed into the surface of a softened transparent plate, or the material may be cast in a suitable mold to produce the described pattern. The plate may also be formed, in the case of thermoplastic materials such as polystyrene or the polymethacrylates, by a modified extrusion process.

In the preferred structure shown, the angle "b" of the prism faces and the angle "a" of the adjacent pyramid faces of the described pattern are 27½° with respect to the plane or first surface 22. It will be understood, however, that the bright areas are considerably brighter in individual areas when the prism and pyramidal angles are greater than about 29° because of directly refracted light of angular faces above the cut-off angle, and these brighter areas may be objectionable, especially if the faces are relatively large in extent. I prefer that both prismatic and pyramidal surfaces be provided at angles in the range of about 26 to 29° with a pattern having individual pyramidal bases less than about one-half inch square, this being considered in the terms of this patent specification to provide light and dark areas which are "relatively" small which become blended and unobjectionable to an observer in relation to ceiling lighting of interior spaces. FIG. 6 is drawn to the scale of ten times actual size.

When the angles "a" of the pyramids and the angles "b" of the crossed pair of prisms are about 27½° relative to the plane surface 22, the total thickness of the plate is approximately $4 \times t$ where "$t$" is the displacement of the ridge 32 of the crossed prisms from the base 28 of the pyramidal cavity. As shown, "$t$" is .030 inch and the pyramid base is 0.324 inch square.

When the angles are kept below the cut-off angles for the particular material of which the plates are made, which for styrene is less than about 30°, the light which is transmitted is light which has been once or more times reflected from the internal facets, and reflected back by the internal face of the plane side of the diffuser plate, all of which diffuses the light intensity which an observer sees at the observed face of the diffuser. The angles of the pyramidal faces and the angles of the prism faces need not be the same and it is contemplated that the pattern of relatively light and relatively dark areas may be altered by disposing the prism faces at greater angles than 29° with respect to the plane face of said plate.

The diffuser plate may have the described pattern impressed upon both faces, which provides an even greater scattering of light.

In addition to the optical advantages of the diffuser plate above described, the pattern of crossed ridges which act as structural reinforcing elements in the preferred form permits the use of relatively thin and light weight transparent plates while still maintaining sufficient mechanical strength to prevent sagging when they are mounted at the edges in mounting flanges.

The objectives of the invention have been attained. A diffuser plate has been provided which transmits substantially all of the incident light from an intense source to the whole area of the diffuser plate without presenting areas of extreme brightness and large enough areas to be a source of eye irritation.

This application is a continuation-in-part of applicant's Ser. No. 820,351, filed June 15, 1959, now abandoned.

I claim:

1. A light diffusing plate characterized by having a sight pattern of many alternate light and dark geometric areas, each of relatively small size, comprising a sheet of light-transmitting and refracting material at least one of whose surfaces has impressed therein a plurality of symmetrically arranged side-by-side rectangular pyramidal portions each including four right pyramidal converging faces disposed at angles not greater than about 30° from the plane surface of said plate and a pair of intersecting prism portions whose ridges formed by the intersection of opposed prism faces intersect symmetrically at right angles and are disposed in the apex portion of said pyramidal portion, said prism portions having their ridges parallel to but intermediate in elevation between the base of said pyramidal portion and the intersections of said pyramidal faces with said faces of said prism portions, the faces of said pyramidal portion and the faces of said prism portions being disposed angularly with respect to an imaginary plane passing through the base of said pyramid portion, said angularity being less than the cut-off angle for the material of said sheet.

2. A light diffusing plate characterized by having a sight pattern of many alternate light and dark geometric areas, each of relatively small size, comprising a sheet of light-transmitting and refracting material one of whose surfaces is substantially planar and whose opposite surface has impressed therein a plurality of symmetrically-arranged side-by-side rectangular pyramidal portions each including four right-angularly related side surfaces converging toward said planar surface at angles not greater than about 30° from said planar surface and together defining a substantially frusto-pyramidal cavity and a pair of intersecting prism portions whose ridges formed by the intersection of opposed prism faces intersect symmetrically at right angles disposed in said cavity and having their ridges parallel to and below the plane of the base of said defined cavity and directed away from said planar surface, the faces defining said pyramidal cavity being disposed relative to the plane surface of said plate at an angle less than the cut-off angle for the material of said sheet.

3. The diffuser plate defined in claim 2, in which the faces defining said pyramidal cavity are disposed at an angle with respect to the plane surface of said plate in the range from 26° to 29°.

4. The diffuser plate defined in claim 2, in which the prism faces of said crossed pair are disposed at an angle with respect to the plane surface of said sheet in the range from 26° to 29°.

5. The diffuser plate defined in claim 2, in which the faces defining said pyramidal cavity and the prism faces of said pair of intersecting prism portions are disposed at angles with respect to the plane surface of said sheet in the range from 26° to 29°.

6. The diffuser plate defined in claim 2, in which the material of said plate is polystyrene.

7. The diffuser plate defined in claim 2, in which the depth of said pyramidal cavity if projected to its vertex within the plate is about one-half the overall thickness of said plate.

8. The diffuser plate defined in claim 2, in which the ridges of said prism portions are displaced from the base of said pyramid by about one-fourth the overall thickness of said plate.

9. The diffuser plate defined in claim 2, in which the ridges of said prismatic portions are rounded off in a flat arc whereby to permit direct transmission of light through said arcuate areas without substantial refraction through said plate.

10. A diffuser lens for a fluorescent light fixture comprising a rigid sheet of transparent synthetic resin material, one side of sheet being a substantially plane surface; the other side of said sheet having impressed therein a light scattering pattern consisting of a plurality of adjacent, intaglio right angled pyramids whose normal apices are directed toward said plane surface of said sheet, and each of whose base edges adjoins a base edge of another similar adjacent intaglio pyramid, each of said intaglio right angled pyramids having within its cavity a pair of intersecting prisms whose ridges formed by the intersection of opposed prism faces intersect symmetrically at right angles, the ridges of said prisms being directed away from said plane surface, the ridges of said prisms being parallel to the base of said pyramids, the faces of said prisms intersecting the faces of said intaglio pyramids, the faces defining said prisms and said pyramids being disposed relative to said plane surface of said plate at angles less than the cut-off angle for the material of said sheet whereby a sight pattern of many alternate light and dark geometric areas of relatively small size results.

11. The diffuser lens defined in claim 10, in which the angles of the faces of said pyramids relative to said plane surface are about 27½°.

12. The diffuser lens defined in claim 10, in which the bases of said intaglio pyramids are in the range of ½ to ¼ inch squares.

13. A light diffusing plate characterized by having a sight pattern of many alternate light and dark geometric areas of relatively small size, comprising a sheet of light transmitting and refracting material one of whose surfaces is substantially planar and whose opposite surface has impressed therein a plurality of symmetrically-arranged side-by-side rectangular pyramids having adjoining bases, each of said pyramids having in its apex portion a pair of intersecting intaglio prism portions whose ridges formed by the intersection of opposed prism faces intersect symmetrically at right angles, the ridges of said prism portions being disposed intermediate in elevation between said pyramidal bases and the intersections of said prism faces with said pyramidal faces, the ridges of said pair of prism portions being parallel to said pyramid bases, the faces of said pyramid and of said prisms being disposed relative to the plane surface of said plate at an angle less than the cut-off angle for the material of said sheet.

14. The diffuser plate defined in claim 13 in which the faces defining said pyramid are disposed at an angle with respect to the plane surface of said sheet of not more than 30°.

15. The diffuser plate defined in claim 13 in which the faces defining said pyramid are disposed at an angle with respect to the plane surface of said sheet in the range from 26° to 29°.

16. The diffuser plate defined in claim 13 in which the prism faces of said pair of prism portions are disposed at an angle with respect to the plane surface of said sheet in the range from 26° to 29°.

17. The diffuser plate defined in claim 13 in which the faces defining said pyramid and the prism faces of said pair of prism portions are disposed at angles with respect to the plane surface of said sheet in the range from 26° to 29°.

18. The diffuser plate defined in claim 13, in which the material of said plate is polystyrene.

19. The diffuser plate defined in claim 13, in which the height to said pyramid if projected to its vertex within the plate is about one-half the overall thickness of said plate.

20. The diffuser plate defined in claim 13, in which the ridges of said intersecting prism portions are displaced from the base of said pyramid by about one-fourth the overall thickness of said plate.

21. The diffuser plate defined in claim 13, in which the ridges formed by the intersections of said pyramid faces with adjoining pyramidal faces, and the ridges formed by the intersections of said pyramid faces and the faces of said prism portions are rounded off in a flat arc whereby to permit direct transmission of a portion of the light through said arcuate areas without substantial refraction.

References Cited in the file of this patent

UNITED STATES PATENTS

| | | |
|---|---|---|
| 563,836 | Blondel et al. | July 14, 1896 |
| 1,241,886 | Rowe | Oct. 2, 1917 |
| 2,474,317 | McPhail | June 28, 1949 |
| 2,859,334 | Guth | Nov. 4, 1958 |
| 2,904,673 | Guth | Sept. 15, 1959 |
| 3,001,062 | Winkler | Sept. 19, 1961 |